United States Patent

Colaianna et al.

(10) Patent No.: US 6,939,495 B2
(45) Date of Patent: Sep. 6, 2005

(54) THERMOPROCESSABLE COPOLYMERS OF TFE

(75) Inventors: Pasqua Colaianna, Milan (IT); Giulio Brinati, Milan (IT); Giambattista Besana, Como (IT)

(73) Assignee: Ausimont S.p.A., Milan (IT)

(*) Notice: Subject to any disclaimer, the term of this patent is extended or adjusted under 35 U.S.C. 154(b) by 364 days.

(21) Appl. No.: 10/384,243

(22) Filed: Mar. 10, 2003

(65) Prior Publication Data

US 2003/0187169 A1 Oct. 2, 2003

Related U.S. Application Data

(62) Division of application No. 09/885,930, filed on Jun. 22, 2001, now Pat. No. 6,545,111.

(51) Int. Cl.$^7$ ............................................. B29C 47/00
(52) U.S. Cl. ................................ 264/209.1; 264/331.14
(58) Field of Search ........................ 264/209.1, 331.14; 526/250

(56) References Cited

U.S. PATENT DOCUMENTS

| | | |
|---|---|---|
| 3,865,845 A | 2/1975 | Resnick |
| 4,743,658 A | 5/1988 | Imbalzano et al. |
| 4,864,006 A | 9/1989 | Giannetti et al. |
| 4,940,525 A | 7/1990 | Ezzell et al. |
| 5,093,409 A | 3/1992 | Buckmaster |
| 5,463,006 A | 10/1995 | Abusleme et al. |
| 6,545,111 B2 * | 4/2003 | Colaianna et al. .......... 526/250 |

FOREIGN PATENT DOCUMENTS

EP 0 633 257 1/1951

OTHER PUBLICATIONS

"Fluoride Contamination from Fluoropolymers in Semiconductor Manufacture", Solid State Technology, Jul. 1990, pp 65–68.

"End Groups in Fluoropolymers", Pianca et al, Journal of Fluoride Chemistry 95, 1999, pp 71–84.

* cited by examiner

Primary Examiner—Mark Eashoo
(74) Attorney, Agent, or Firm—Arent Fox PLLC

(57) ABSTRACT

A thermoprocessable copolymer of TFE essentially formed by:

(a) from 4.5 to 8.5% by weight of perfluoromethylvinylether (PMVE);
(b) from 0.3 to 1.6% by weight of a perfluorodioxole of formula:

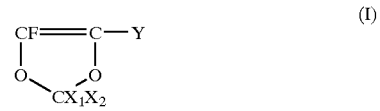

(I)

wherein: Y=F, OR$_f$, R$_f$ wherein R$_f$ is a perfluoroalkyl having from 1 to 5 carbon atoms;

X$_1$ and X$_2$, equal to or diferent from each other, are —F or —CF$_3$;

(c) TFE, forming the remaining part to 100%.

3 Claims, No Drawings

THERMOPROCESSABLE COPOLYMERS OF TFE

This is a Division of application Ser. No. 09/885,930 filed Jun. 22, 2001, now U.S. Pat. No. 6,545,111. The disclosure of the prior application is hereby incorporated by reference herein in its entirety.

The present invention relates to thermoprocessable perfluorinated polymers for the preparation of manufactured articles used in the semicon industry, which show very low values of extractable $F^-$, both on perfluoropolymer pellet and the manufactured articles therefrom.

Specifically, the present invention relates to thermoprocessable copolymers of tetrafluoroethylene (TFE) which show very low values of extractable $F^-$ combined with very good mechanical and elastomeric properties combine wherefore they result particularly suitable to be used in the semicon industry in the preparation of pipes, fittings and tanks for the storage and the transportation of chemical compounds and of ultrapure water. Besides, the thermoprocessable copolymers of tetrafluoroethylene (TFE) of the invention show very low values of extractable $Cl^-$, lower than 0.2 ppm by weight with respect to the polymer weight, preferably lower than the analytical detection limits.

It is well known that in the semicon industry tanks and piping systems (pipes and fittings) are made of fluorinated polymer materials which during the use must release a minimum amount of $F^-$, lower than or equal to 1 ppm, so as not to contaminate the transported fluids, thus avoiding the damaging of silicon-based wafers. In the paper "Fluoride Contamination from Fluoropolymers in Semiconductor Manufacture" published on "State Solid Technology" pages 65–68, July 1990, it is stated that for the semicon industry it would be desirable to obtain finished manufactured articles which during the use release a minimum amount of $F^-$, in particular lower than or equal to 1 ppm.

The manufactured articles for the semicon industry are generally prepared with thermoprocessable copolymers of TFE and perfluoropropylvinylether (PPVE), belonging to the PFA class, wherein PPVE is about 3.5–4.5% by weight. Said copolymers are preferably obtained by a polymerization process in aqueous emulsion which allows to obtain a high productivity and the formation of polymer structures having a high molecular weight, therefore characterized by good mechanical properties and high ductility. However the TFE/PPVE copolymers contain a certain amount of chain end groups of ionic type —$CF_2COOH$ and of —COF type. The —COF end group, as a consequence of hydrolysis reactions which occur during the polymerization itself, can be transformed into ionic —$CF_2COOH$ end group. In the processing, for example for the preparation of pipes or fittings, said end groups can decompose producing hydrofluoric acid HF. The formed hydrofluoric acid is released during the time from the manufactured article during the use in the semicon production plant, causing an unacceptable corrosion of silicon-based wafers. To minimize the HF formation during the processing so that the finished manufactured article shows the minimum amount of extractable $F^-$, the prior art uses a fluorination process to transform the end groups into stable perfluorinated groups. See for example U.S. Pat. No. 4,743,658, wherein the TFE/PPVE copolymer is subjected to fluorination with elemental fluorine for reducing the amount of ionic end groups so that the fluorine extractable from the finished manufactured article is lower than 3 ppm by weight with respect to the polymer. Said process requires an additional step and from the industrial point of view it is not easily feasible since it uses elemental fluorine, very aggressive agent which requires special equipments for making the treatment safe and reliable.

Other processes for reducing the ionic end group number in perfluorinated copolymes are known. See for example U.S. Pat. No. 5,093,409 wherein the TFE/PPVE copolymer under the form of latex is treated with amines at 160°–400° C. for a sufficient time to convert the ionic —$CF_2COOH$ end groups into —$CF_2H$ groups. Also this post-treatment for stabilizing the fluoropolymer requires a specific unit and it results therefore expensive from the economic point of view.

A class of thermoprocessable copolymers of TFE having very high chemical inertia and thermal stability is described in U.S. Pat. No. 5,463,006, wherein terpolymers formed by TFE/PPVE/PMVE (perfluoromethylvinylether) are described. Tests carried out by the Applicant, see the comparative Examples, show that with these terpolymers release values of $F^-$ lower than 1 ppm are not obtained both on the polymer (pellet) and on the finished manufactured article. Therefore also in this case it is necessary to carry out one of the above post-treatments for reducing the values of extractable $F^-$.

In conclusion, the thermoprocessable TFE copolymers of the prior art used for pipes in the semicon industry show a very good combination of properties, such high flex life, good mechanical properties at high and low temperature and release values of $F^-$ lower than 1 ppm. However the drawback of said products is that the combination of said properties is obtained with the proviso to subject them to a specific treatment of fluorination or conversion of the end groups of the previously described type. All this requires a further processing step and an additional specific unit, making therefore difficult the process from the industrial point of view and making it expensive from the economic point of view.

Besides values of extractable $F^-$ lower than or equal to 1 ppm, good mechanical properties both at low (23° C.) and high temperature (250° C.), good flex life, it would be desirable to carry out the processing of the manufactured articles, for example pipes, without compromising the productivity thereof. At present in the preparation of pipes having a low release of $F^-$ for the semicon industry, perfluoropolymers post-treated as above indicated are absolutely necessary and not high extrusion rates are used.

The need was therefore felt to have available in the semicon industry a thermoprocessable fluoropolymer able to give finished manufactured articles having the following combination of proprties:

release values of $F^-$ ions, both on the polymer pellet and on the finished manufactured article, lower than 1 ppm by weight with respect to the polymer weight;

said release values of $F^-$ ions lower than 1 ppm, in the case of extruded manufactured articles (pipes), are obtainable also at high extrusion rate;

very low values of extractable $Cl^-$, lower than 0.2 ppm by weight with respect to the polymer weight, preferably lower than the analytical limits;

flex life values higher than 20,000 combined with a MFI range (measured at 372° C. with a 5 Kg load) comprised between 1 and 5.

very good mechanical properties both at low temperature (23° C.) and at high temperature (250° C.).

The Applicant has surprisingly and unexpectedly found that it is possible to obtain the combination of the above properties by using the specific monomeric composition of thermoprocessable copolymers of TFE as defined hereunder.

An object of the present invention is therefore a thermo-processable copolymer of TFE consisting essentially of:
(a) from 4.5 to 8.5% by weight of perfluoromethylvinylether (PMVE);
(b) from 0.3 to 1.6% by weight of a perfluorodioxole of formula:

(I)

wherein: Y=F, OR$_f$, R$_f$ wherein R$_f$ is a perfluoroalkyl having from 1 to 5 carbon atoms;
X$_1$ and X$_2$, equal to or diferent from each other, are —F or —CF$_3$;
(c) TFE, forming the remaining part to 100%;
said copolymer having:
a number of ionic end groups lower than $4 \times 10^{-4}$ mol/Kg of polymer;
flex life values higher than 20,000 in a MFI range (measured at 372° C. with a 5 Kg load) comprised between 1 and 5;
release values of F$^-$ ions, both on the polymer in pellet and on the finished manufactured article, lower than 1 ppm by weight with respect to the polymer weight;
release values of F$^-$ ions lower than 1 ppm on extruded manufactured articles (pipes), obtained both at low and high extrusion rate of the polymer.

The ionic end groups are for example of —COOH and —COF type.

Among the comonomers (b) the one wherein Y=F, X$_1$,X$_2$=CF$_3$ can for example be mentioned; said compound is perfluoro-2,2-dimethyl-1,3-dioxole (PDD). See for example U.S. Pat. No. 3,865,845.

Preferably in the present invention the compound of formula (I) wherein Y=OR$_f$ where R$_f$=—CF$_3$; X$_1$,X$_2$=F is used as monomer (b). Said compound is named 2,2,4-trifluoro-5-trifluoromethoxy-1,3-dioxole (TTD).

The copolymers of the invention, besides showing very good mechanical properties both at hot and cold as above mentioned, and very good flex life, unexpectedly do not require any treatment of fluorination or transformation of the end groups of the type of those above described, for obtaining extractable values of F$^-$ lower than 1 ppm on the finished manufactured articles. This result in the case of extruded manufactured articles, for example pipes, is surprising since it is obtainable at various extrusion rates of the manufactured article and do not penalize the productivity during the material processing (see the Examples). In fact one can operate also at an extrusion rate double than those at present used in the manufactured article processing for the semicon industry, without having a release of F$^-$ ions higher than 1 ppm. This is extremely important from the industrial point of view since the productivity is doubled.

To obtain the above combination of properties which makes the finished manufactured articles suitable to be used in the semicon industry, it has been found by the Applicant that it is necessary to use in polymerization comonomers (a) and (b) in the above defined amounts so that the amount of ionic end groups is the above mentioned one. In fact, tests carried out by the Applicant (see the comparative Examples) show that when the concentrations of perfluorodioxole or perfluoromethylvinylether are higher than the indicated limits, there is a worsening of the mechanical properties in hot conditions, in particular the stress at break, measured at 250° C., becomes lower than 5 MPa and the elongation at break (at 250° C.) becomes lower than 350%, which are the minimum acceptable values for a commercial fluoropolymer HYFLON$^R$ MFA 620. When on the contrary the concentrations of perfluoromethylvinylether or perfluorodioxole are lower than the indicated values, the finished polymer shows low flex life values and therefore it does not result satisfactory in the applications of semicon industry.

When the copolymers of the invention are used for obtaining pipes by extrusion, they preferably have a MFI in the range 1–5 measured at 372° C. with a 5 kg load.

When the copolymers of the invention are used for obtaining by moulding fittings, connections for pipings, etc., they preferably have a MFI comprised between 6 and 30 measured at 372° C. with a 5 kg load.

The copolymers of the invention can be obtained by polymerizing the monomers by radical route both in aqueous and in organic medium. The polymerization in aqueous medium can be carried out in emulsion or in microemulsion in the presence of a radical inorganic initiator such as for example the ammonium and/or potassium and/or sodium persulphate, optionally in combination with ferrous, cuprous or silver salts. The initiator feeding can be made in a continuous way or by a single addition at the starting of the polymerization. This latter method is preferable since it reduces the polymerization times, the ionic end groups in the polymer being equal. It has been found by the Applicant that the used initiator amount must be low. For example by operating at a temperature of 75° C. with a pressure of 22 absolute bar, the initiator amount, all fed at the starting of the polymerization, and in an amount lower than 0.03 grams of potassium persulphate for litre of water, allows to obtain the above indicated number of ionic end groups.

To obtain the results of the present invention it is preferable that the perfluorodioxole monomer (b) is fed in a continuous way during the whole polymerization.

The synthesis temperature can be in the range 25°–120° C. A temperature range 60°–95° C. is preferred when polymerization is carried out in aqueous emulsion or microemulsion in the presence of persulphates. The polymerization can take place at pressures in the range 10–50 bar.

The polymerization in aqueous medium requires the presence of a surfactant, fluorinated surfactants such as perfluorooctanoate or ammonium, potassium or sodium perfluorooctanoate, perfluorononanoate, perfluorodecanoate mixtures are particularly preferred. It is particularly suitable to carry out the polymerization in aqueous phase in the presence of perfluoropolyethers as surfactants. Such perfluoropolyethers can be added to the reaction medium under the form of a microemulsion, as described in U.S. Pat. No. 4,864,006.

For the control of the molecular weight of the invention terpolymers, chain transfer agents such as hydrogen, methane, ethane, propane are used; which give end groups of hydrogenated type, suitable therefore to the applications of the invention in the semicon industry. Chlorinated transfer agents are not used since it has been found that they produce amounts of extractable Cl$^-$ dangerous for the semicon industry.

The polymerization latex is coagulated with a coagulant such as for example nitric acid; then the slurry washing and the subsequent drying of the wet polymer take place. The powder is then pelletized in a twin-screw extruder equipped with at least two degassing zones.

The present invention will be better illustrated by the following Examples, which have a merely indicative but not limitative purpose of the scope of the invention itself.

EXAMPLES

Characterization

The following measurements are carried out on the copolymer granules of the invention:

MFI at 5 Kg and 372° C. according to ASTM D-1238-52T method.

DSC for the measurement of the $2^{nd}$ melting temperature according to the procedure described in U.S. Pat. No. 5,463,006 in the name of the Applicant.

Tensile properties (stress and elongation at break, yield stress and Young modulus) at room remperature and at T=250° C.

MIT Flex Life according to the procedure described in U.S. Pat. No. 5,463,006.

Determination of the chain end groups by IR analysis carried out on pellet by cold compression as described in the paper "End-groups in Fluoropolymer" published by the review Journal of Fluorine Chemistry 95 (1999), pages 71–84;

Determination of the monomeric composition by IR analysis;

Determination of the release of the $F^-$ anions on pellets at 85° C. by ionic chromatography. The specimen preparation is carried out by using KaPak®/Scotchpack vessels filled with deionized water at 18 MΩ and an amount equal to 5 grams of pellets. The vessels containing the polymer specimen are closed and kept in a bath at 85° C. for 24 hours. Then the water contained in the vessels is analyzed by ionic chromatography, according to the following conditions:

column and precolumn AS4A+AG4A–Dionex;

eluent: $Na_2B_4O_7$, 3.0 millimolar, flow 1 cc/min;

Detection: suppressed conductivity;

the pellets have been extruded for obtaining pipes by using an extruder having a 45 mm diameter.

The extruder set-up has the following geometrical characteristics:

die diameter=53.58 mm; tip diameter=44.73 mm; pipe external diameter=12 mm; polymer thickness=1 mm; DDR=20 DRB=0.99. The following temperature profile has been used:

barrel temperature zone 1=325° C.; barrel temperature zone 2 and 3=330° C.; barrel temperature zone 4 and collar=335° C.; neck temperature=325° C.; body temperature and die holder=330° C.; die temperature=335° C.; melted temperature=342° C. Extrusion rates equal to 0.7 and 1.8 meters/min are used in the Examples.

Also on the extruded pipes the released $F^-$ analysis is carried out by using the same procedures described for pellets, with the difference that in the KaPak®/Scotchpack vessels a piece of pipe having a weight equal to 5 grams is inserted.

Example 1

In a 22 l AISI 316 steel vertical autoclave, equipped with stirrer working at 400 rpm, after vacuum having been made, 13.9 litres of demineralized water, 0.5 g of 2,2,4-trifluoro-5-trifluoromethoxy-1,3-dioxole (TTD), and 160 g of an aqueous microemulsion of perfluoropolyether prepared according to the procedures described in Example 1 of patent U.S. Pat. No. 4,864,006, are introduced in sequence.

The autoclave is heated up to the reaction temperature equal to 75° C.: 0.37 bar of ethane and 2.0 absolute bar of perfluoromethylvinylether (PMVE) are then fed. A gaseous mixture having the following molar ratios: TFE/PMVE=34.97; PMVE/TTD=7.91; TFE/TTD=276.8, is fed by a compressor up to a pressure of 22 absolute bar.

The composition of the gaseous mixture present in the autoclave top is analyzed by gaschromatography. Before the reaction starts, the gas phase results to be formed by the following molar percentages: 87.7% TFE, 11% PMVE, 0.3% TTD, 1% Ethane. Then by a metering pump 72 $cm^3$ of a potassium persulphate 0.0103 molar solution are fed.

The polymerization pressure is maintained constant by feeding the monomeric mixture having the above defined ratios among the monomers and when 8,800 g of the aforesaid mixture have been fed, the reaction is stopped. The reactor is cooled to room temperature, the emulsion is discharged and coagulated with $HNO_3$ (65%). Subsequently the polymer is washed with $H_2O$ and dried at about 220° C. The copolymer composition by weight is equal to:

| | |
|---|---|
| PMVE | 4.7% |
| TTD | 0.72% |
| TFE | 94.58% |

Polymer properties, the number of ionic end groups (measured by IR), and the value of extractable $F^-$ on the granule are reported in Table 1.

Mechanical properties both under cold (23° C.) and under heating (250° C.) and the flex-life values are reported in Table 2.

Example 2

In the same autoclave used in Example 1, after vacuum having been made, 13.9 litres of demineralized water, 0.5 g of TTD, and 160 g of the above mentioned microemulsion, are in sequence introduced.

The autoclave is heated up to the reaction temperature equal to 75° C.: 0.34 bar of ethane and 2.2 bar of PMVE are then introduced. A gaseous mixture having the following molar ratios: TFE/PMVE=32.22; PMVE/TTD=8.57; TFE/TTD=276.14 is fed by a compressor up to a pressure of 22 absolute bar.

The composition of the gaseous mixture present in the autoclave top is analyzed by gaschromatography. Before the reaction starts, the gas phase results to be formed by the following molar percentages: 87.28% TFE, 11.5% PMVE, 0.3% TTD, 0.92% Ethane. Then by a metering pump 72 $cm^3$ of a potassium persulphate 0.0103 molar solution are fed.

The polymerization pressure is maintained constant by feeding the monomeric mixture having the above defined ratios among the monomers and when 8,800 g of the aforesaid mixture have been fed, the reaction is stopped. The reactor is cooled to room temperature, the emulsion is discharged and coagulated with $HNO_3$ (65%) Subsequently the polymer is washed with $H_2O$ and dried at about 220° C. The copolymer composition by weight is equal to:

| | |
|---|---|
| PMVE | 5.1% |
| TTD | 0.72% |
| TFE | 94.18% |

Polymer properties, the number of ionic end groups (measured by IR), and the value of extractable $F^-$ on the granule are reported in Table 1.

Mechanical properties both under cold (23° C.) and under heating (250° C.) and the flex-life values are reported in Table 2.

Example 3

In the same autoclave used in Example 1, after vacuum having been made, 13.9 litres of demineralized water, 0.1 g of TTD, and 160 g of the above mentioned microemulsion, are in sequence introduced.

The autoclave is heated up to the reaction temperature equal to 75° C.: 0.36 bar of Ethane and 2.86 bar of PMVE are then introduced. A gaseous mixture having the following molar ratios: TFE/PMVE=27.51; PMVE/TTD=17.5; TFE/TTD=481.4 is fed by a compressor up to a pressure of 22 absolute bar.

The composition of the gaseous mixture present in the autoclave top is analyzed by gaschromatography. Before the reaction starts, the gas phase results to be formed by the following molar percentages: 82.82% TFE, 16% PMVE, 0.18% TTD, 1% Ethane. Then by a metering pump 72 cm³ of a potassium persulphate 0.0103 molar solution are fed.

The polymerization pressure is maintained constant by feeding the monomeric mixture having the above defined ratios among the monomers and when 8,800 g of the aforesaid mixture have been fed, the reaction is stopped. The reactor is cooled to room temperature, the emulsion discharged and coagulated with $HNO_3$ (65%). Subsequently the polymer is washed with $H_2O$ and dried at about 220° C.

The copolymer composition by weight is equal to:

| PMVE | 6.1% |
|---|---|
| TTD | 0.41% |
| TFE | 93.49% |

Polymer properties, the number of ionic end groups (measured by IR), and the value of extractable $F^-$ on the granule are reported in Table 1.

Mechanical properties both under cold (23° C.) and under heating (250° C.) and the flex-life values are reported in Table 2.

Example 4

One works with the same autoclave of Example 1. After vacuum having been made, 13.9 litres of demineralized water, 0.5 g of TTD, and 160 g of the above mentioned microemulsion, are in sequence introduced. The autoclave is heated up to the reaction temperature equal to 75° C.: 0.35 bar of Ethane and 2.86 absolute bar of PMVE are then introduced. A gaseous mixture having the following molar ratios: TFE/PMVE=27.47; PMVE/TTD=10.0; TFE/TTD=285.71 is fed by a compressor up to a pressure of 22 absolute bar.

Before the reaction starts, the gas phase results to be formed by the following molar percentages: 82.6% TFE, 16.05% PMVE, 0.35% TTD, 1% Ethane. Then by a metering pump 72 cm³ of a potassium persulphate 0.0103 molar solution are fed.

The polymerization pressure is maintained constant by feeding the monomeric mixture having the above defined ratios among the monomers and when 8,800 g of the aforesaid mixture have been fed, the reaction is stopped. The reactor is cooled to room temperature, the emulsion is discharged and coagulated with HNO3 (65%). Subsequently the polymer is washed with $H_2O$ and dried at about 220° C.

The copolymer composition by weight is equal to:

| PMVE | 6.1% |
|---|---|
| TTD | 0.72% |
| TFE | 93.18% |

Polymer properties, the number of ionic end groups (measured by IR), and the extractable $F^-$ value on the granule are reported in Table 1.

Mechanical properties both under cold (23° C.) and under heating (250° C.) and the flex-life values are reported in Table 2.

The extractable $F^-$ values obtained on extruded pipes at a low extrusion rate equal to 0.7 and at high extrusion rate equal to 1.8 meter/min are reported in Table 4.

Example 5

One works with the same autoclave of Example 1. After vacuum having been made, 13.9 litres of demineralized water, 1.15 g of TTD, and 160 g of the above mentioned microemulsion, are in sequence introduced. The autoclave is heated up to the reaction temperature equal to 75° C.: 0.35 bar of Ethane and 2.86 absolute bar of PMVE are then introduced. A gaseous mixture having the following molar ratios: TFE/PMVE=27.4; PMVE/TTD=5.83; TFE/TTD=159.83 is fed by a compressor up to a pressure of 22 absolute bar.

Before the reaction starts, the gas phase results to be formed by the following molar percentages: 81.4% TFE, 17% PMVE, 0.6% TTD, 1% Ethane. Then by a metering pump 72 cm³ of a potassium persulphate 0.0103 molar solution are fed.

The polymerization pressure is maintained constant by feeding the monomeric mixture having the above defined ratios among the monomers and when 8,350 g of the aforesaid mixture have been fed, the reaction is stopped. The reactor is cooled to room temperature, the emulsion is discharged and coagulated with $HNO_3$ (65%). Subsequently the polymer is washed with $H_2O$ and dried at about 220° C.

The copolymer composition by weight is equal to:

| PMVE | 6.1% |
|---|---|
| TTD | 1.22% |
| TFE | 92.68% |

Polymer properties, the number of ionic end groups (measured by IR), and the extractable $F^-$ value on the granule are reported in Table 1.

Mechanical properties both under cold (23° C.) and under heating (250° C.) and the flex-life values are reported in Table 2.

Example 6 (Comparative)

One works with the same autoclave of Example 1. After vacuum having been made, 13.9 litres of demineralized water, 1.5 g of TTD, and 160 g of the above mentioned microemulsion, are in sequence introduced. The autoclave is heated up to the reaction temperature equal to 75° C.: 0.34 bar of Ethane and 2.86 absolute bar of PMVE are then introduced. A gaseous mixture having the following molar ratios: TFE/PMVE=27.28; PMVE/TTD=3.5; TFE/TTD=95.5 is fed by a compressor up to a pressure of 22 absolute bar. Before the reaction starts, the gas phase results to be formed by the following molar percentages: 81.3% TFE, 16.7% PMVE, 1.09 TTD, 1% Ethane. Then by a metering pump 72 cm³ of a potassium persulphate 0.0103 molar solution are fed.

The polymerization pressure is maintained constant by feeding the monomeric mixture having the above defined ratios among the monomers. Contemporaneously with the feeding of 3,500 and 7,100 g of the aforesaid mixture, 36 cm³ and 18 cm³ of the potassium persulphate solution are added by a metering pump.

The reaction is stopped when 8,800 g of the aforesaid monomeric mixture have in total been fed. Then the reactor is cooled to room temperature, the emulsion is discharged and coagulated with $HNO_3$ (65%). Subsequently the polymer is washed with $H_2O$ and dried at about 220° C.

The copolymer composition by weight is equal to:

| PMVE | 6.1% |
|---|---|
| TTD | 2.0% |
| TFE | 91.9% |

Polymer characteristics, the number of ionic end groups (measured by IR), and the extractable $F^-$ value on the granule are reported in Table 1.

Mechanical properties both under cold (23° C.) and under heating (250° C.) and the flex-life values are reported in Table 3.

It is noticed that as regards the mechanical properties under heating, the stress at break is lower than 5 MPa and the elongation at break is lower than 350%.

Example 7 (Comparative)

In the same autoclave used in Example 1, after vacuum having been made, 13.9 litres of demineralized water, 0.5 g of TTD, and 160 g of the above mentioned microemulsion, are in sequence introduced.

The autoclave is heated up to the reaction temperature equal to 75° C.: 0.47 absolute bar of Ethane and 1.2 absolute bar of PMVE are then introduced. A gaseous mixture having the following molar ratios: TFE/PMVE=64.13; PMVE/TTD=4.37; TFE/TTD=280.34 is fed by a compressor up to a pressure of 22 absolute bar.

The gas phase before the reaction starts, is formed by the following molar percentages: 91.2% TFE, 7.5% PMVE, 0.3% TTD, 1% Ethane. Then by a metering pump 72 cm³ of a potassium persulphate 0.0103 molar solution are fed.

The polymerization pressure is maintained constant by feeding the aforesaid monomeric mixture and after having fed 8,800 g of the aforesaid mixture the reaction is stopped. The reactor is cooled to room temperature, the emulsion is discharged and coagulated with $HNO_3$ (65%). Subsequently the polymer is washed with $H_2O$ and dried at about 220° C.

The copolymer composition by weight is equal to:

| PMVE | 2.8% |
|---|---|
| TTD | 0.72% |
| TFE | 96.48% |

Polymer characteristics, the number of ionic end groups (measured by IR), and the extractable $F^-$ value on the granule are reported in Table 1.

Mechanical properties both under cold (23° C.) and under heating (250° C.) and the flex-life values are reported in Table 3. It is noticed that the flex life value is lower than 20,000.

Example 8 (Comparative)

One works with the autoclave of Example 1. After vacuum having been made, 13.9 litres of demineralized water, 0.5 g of TTD, and 160 g of the above mentioned microemulsion, are in sequence introduced.

The autoclave is heated up to the reaction temperature equal to 75° C.; 0.31 bar of Ethane and 4.34 absolute bar of PMVE are then introduced. A gaseous mixture having the following molar ratios: TFE/PMVE=16.64; PMVE/TTD=16.14; TFE/TTD=268.57 is fed by a compressor up to a pressure of 22 absolute bar.

The gas phase, before the reaction starts, is formed by the following molar percentages: 76.33% TFE, 22.5% PMVE, 0.31% TTD, 0.86% Ethane. Then by a metering pump 72 cc of a potassium persulphate 0.0103 molar solution are fed.

The polymerization pressure is maintained constant by feeding the aforesaid monomeric mixture and after 8,800 g of the aforesaid mixture have been fed the reaction is stopped. The reactor is cooled to room temperature, the emulsion is discharged and coagulated with $HNO_3$ (65%). Subsequently the polymer is washed with $H_2O$ and dried at about 220° C.

The copolymer composition by weight is equal to:

| PMVE | 9.3% |
|---|---|
| TTD | 0.72% |
| TFE | 89.98% |

Polymer characteristics, the number of ionic end groups (measured by IR), and the extractable $F^-$ value on the granule are reported in Table 1.

Mechanical properties both under cold (23° C.) and under heating (250° C.) and the flex-life values are reported in Table 3.

It is noticed that as regards the mechanical properties under heating, the stress at break is lower than 5 MPa and the elongation at break is lower than 350%. Besides Table 1 shows that the extractable $F^-$ values are higher than 1 ppm.

Example 9 (Comparative)

In the same autoclave used in Example 1, after vacuum having been made, 13.9 litres of demineralized water, 80 g of perfluoropropylvinylether (PPVE) and 128 g of the above mentioned microemulsion, are in sequence introduced.

The autoclave is heated up to the reaction temperature equal to 75° C.: 0.28 bar of Ethane and 2.86 bar of PMVE are then introduced. A gaseous mixture in a molar ratio TFE/PMVE=28.85 is fed by a compressor up to a pressure of 22 absolute bar.

The composition of the gaseous mixture present in the autoclave top is analyzed by gaschromatography. Before the reaction starts, the gas phase results to be formed of the following molar percentages: 79.2% TFE, 16% PMVE, 4% PPVE, 0.77% Ethane. Then by a metering pump a potassium persulphate 0.0103 molar solution with a flow-rate of 170 cm³/h is fed.

The polymerization pressure is maintained constant by feeding the monomeric mixture having the above defined ratios among the monomers and when 8.720 g of the above mixture have been fed, the reaction is stopped. The reactor is cooled to room temperature, the emulsion is discharged and coagulated with $HNO_3$ (65%). Subsequently the polymer is washed with $H_2O$ and dried at about 220° C.

The copolymer composition by weight is equal to:

| | |
|---|---|
| PMVE | 6.0% |
| PPVE | 1.0% |
| TFE | 93.0% |

Polymer characteristics, the number of ionic end groups (measured by IR), and the extractable $F^-$ value on the granule are reported in Table 1. Table 1 shows that the extractable $F^-$ values are higher than 1 ppm.

Mechanical properties both under cold (23° C.) and under heating (250° C.) and the flex-life values are reported in Table 3.

The extractable $F^-$ values on an extruded pipe at low extrusion rate (0.7 meter/minute) and at high extrusion rate (1.8 meter/minute) are reported in Table 4.

TABLE 1

| Example | Composition (% by wt.) | MFI (5 Kg 372° C.) | $T_{II}$ melting (° C.) | Ionic end groups (mol/Kg) | $F^-$ 24 h (ppm) |
|---|---|---|---|---|---|
| 1 | 4.7% PMVE 0.72% TTD | 3.0 | 294 | $2.5 \times 10^{-4}$ | 1.0 |
| 2 | 5.1% PMVE 0.72% TTD | 3.5 | 292.2 | $2.2 \times 10^{-4}$ | 0.9 |
| 3 | 6.1% PMVE 0.41% TTD | 3.4 | 288.3 | $2.0 \times 10^{-4}$ | 0.9 |
| 4 | 6.1% PMVE 0.72% TTD | 3.4 | 287 | $2.7 \times 10^{-4}$ | 0.8 |
| 5 | 6.1% PMVE 1.22% TTD | 3.5 | 283.5 | $3.0 \times 10^{-4}$ | 1.0 |
| 6 (Comp.) | 6.1% PMVE 2.0% TTD | 4 | 279 | $3.5 \times 10^{-4}$ | 1.0 |
| 7 (Comp.) | 2.8% PMVE 0.72% TTD | 2.6 | 305 | $2.5 \times 10^{-4}$ | 1.0 |
| 8 (Comp.) | 9.3% PMVE 0.72% TTD | 4 | 265.5 | $6.0 \times 10^{-4}$ | 1.8 |
| 9 (Comp.) | 6.0% PMVE 1.0% PPVE | 3 | 286 | $10 \times 10^{-4}$ | 3.0 |

TABLE 2

| | | EXAMPLE | | | | |
|---|---|---|---|---|---|---|
| | | 1 | 2 | 3 | 4 | 5 |
| Copolymer composition (% by weight) | | 4.7% PMVE 0.72% TTD | 5.1% PMVE 0.72% TTD | 6.1% PMVE 0.41% TTD | 6.1% PMVE 0.72% TTD | 6.1% PMVE 1.22% TTD |
| Flex-life | | 21,000 | 23,000 | 21,000 | 42,000 | 69,560 |
| Mechanical properties at 23° C. | | | | | | |
| Elastic Modulus | (MPa) | 487 | 480 | 437 | 462 | 454 |
| Yield stress | (MPa) | 14.3 | 14.4 | 14.2 | 14.8 | 15 |
| Stress at break | (MPa) | 28.9 | 29 | 28.5 | 30 | 32.6 |
| Elongation at break | (%) | 333 | 335 | 330 | 305 | 322 |
| Mechanical properties at 250° C. | | | | | | |
| Elastic Modulus | (MPa) | 18.8 | 18 | 16 | 16.8 | 13 |
| Yield stress | (MPa) | 3.2 | 3.2 | 2.9 | 2.9 | 2.6 |
| Stress at break | (MPa) | 5.9 | 5.5 | 5.1 | 5.6 | 5.5 |
| Elongation at break | (%) | 405 | 370 | 359 | 350 | 380 |

TABLE 3

| | | EXAMPLE | | | |
|---|---|---|---|---|---|
| | | 6 (Comp.) | 7 (Comp.) | 8 (Comp.) | 9 (Comp.) |
| Copolymer composition (% by weight) | | 6.1% PMVE 2.0% TTD | 2.8% PMVE 0.72% TTD | 9.3% PMVE 0.72% TTD | 6.0% PMVE 1.0% PPVE |
| Flex-life | | 78,500 | 3,850 | 140,000 | 50,000 |
| Mechanical properties at 23° C. | | | | | |
| Elastic modulus | (MPa) | 447 | 474 | 433 | 481 |
| Yield stress | (MPa) | 15 | 14.0 | 14.2 | 14.5 |

TABLE 3-continued

| | | EXAMPLE | | | |
|---|---|---|---|---|---|
| | | 6 (Comp.) | 7 (Comp.) | 8 (Comp.) | 9 (Comp.) |
| Stress at break | (MPa) | 31.9 | 25.5 | 33 | 29.8 |
| Elongation at break | (%) | 310 | 339 | 382 | 312 |
| Mechanical properties at 250° C. | | | | | |
| Elastic modulus | (MPa) | 12 | 28 | 8.2 | 17 |
| Yield stress | (MPa) | 2.4 | 3.8 | 1.7 | 2.9 |
| Stress at break | (MPa) | 4.5 | 5.9 | 3.3 | 6.0 |
| Elongation at break | (%) | 320 | 382 | 310 | 419 |

TABLE 4

| EXAMPLE | Pipe extrusion rate (m/min) | F⁻ 24 h (ppm) |
|---|---|---|
| 4 | 1.8 | 0.9 |
| | 0.7 | 0.9 |
| 9 (Comp.) | 1.8 | 2.1 |
| | 0.7 | 2.0 |

What is claimed is:

1. A method of manufacturing a pipe, said method comprising extruding thermoprocessable copolymers of TFE to form said pipe, wherein said thermoprocessable copolymers of TFE consist essentially of:
   (a) from 4.5 to 8.5% by weight of perfluoromethylvinylether (PMVE);
   (b) from 0.3 to 1.6% by weight of a perfluorodioxole of formula:

wherein: Y=F, OR$_f$, R$_f$ wherein R$_f$ is a perfluoroalkyl having from 1 to 5 carbon atoms;
   X$_1$ and X$_2$, equal to or different from each other, are —F or —CF$_3$;
   (c) TFE, forming the remaining part to 100%; said copolymer having:
      a number of ionic end groups lower than $4 \times 10^{-4}$ mol/Kg of polymer;
      flex life values higher than 20,000 in a MFI range (measured at 372° C. with a 5 Kg load) comprised between 1 and 5;
      release values of F⁻ ions on the polymer in pellet and on the finished manufactured article lower than 1 ppm by weight with respect to the polymer weight;
      release values of F⁻ ions lower than 1 ppm on extruded manufactured articles, both at low and high extrusion rate of the polymer.

2. A method of manufacturing a fitting or connection for pipings, said method comprising moulding thermoprocessable copolymers of TFE to form said fitting or connection for pipings,
   wherein said thermoprocessable copolymers of TFE consist essentially of:
   (a) from 4.5 to 8.5% by weight of perfluoromethylvinylether (PMVE);
   (b) from 0.3 to 1.6% by weight of a perfluorodioxole of formula:

wherein: Y=F, OR$_f$, R$_f$ wherein R$_f$ is a perfluoroalkyl having from 1 to 5 carbon atoms;
   X$_1$ and X$_2$, equal to or different from each other, are —F or —CF$_3$;
   (c) TFE, forming the remaining part to 100%; said copolymer having:
      a number of ionic end groups lower than $4 \times 10^{-4}$ mol/Kg of polymer;
      flex life values higher than 20,000 in a MFI range (measured at 372° C. with a 5 Kg load) comprised between 1 and 5;
      release values of F⁻ ions on the polymer in pellet and on the finished manufactured article lower than 1 ppm by weight with respect to the polymer weight;
      release values of F⁻ ions lower than 1 ppm on extruded manufactured articles, both at low and high extrusion rate of the polymer.

3. A method of manufacturing an article, said method comprising forming said manufactured article by extruding or moulding thermoprocessable copolymers of TFE,
   wherein said thermoprocessable copolymers of TFE consist essentially of:
   (a) from 4.5 to 8.5% by weight of perfluoromethylvinylether (PMVE);
   (b) from 0.3 to 1.6% by weight of a perfluorodioxole of formula:

wherein: Y=F, OR$_f$, R$_f$ wherein R$_f$ is a perfluoroalkyl having from 1 to 5 carbon atoms;
   X$_1$ and X$_2$, equal to or different from each other, are —F or —CF$_3$;

(c) TFE, forming the remaining part to 100%; said copolymer having:
a number of ionic end groups lower than $4 \times 10^{-4}$ mol/Kg of polymer;
flex life values higher than 20,000 in a MFI range (measured at 372° C. with a 5 Kg load) comprised between 1 and 5;
release values of $F^-$ ions on the polymer in pellet and on the finished manufactured article lower than 1 ppm by weight with respect to the polymer weight;
release values of $F^-$ ions lower than 1 ppm on extruded manufactured articles, both at low and high extrusion rate of the polymer.

* * * * *